United States Patent [19]

Takeuchi

[11] Patent Number: 5,475,544
[45] Date of Patent: Dec. 12, 1995

[54] HEAD POSITIONING CONTROL DEVICE FOR A MAGNETIC DISK APPARATUS

[75] Inventor: Toshio Takeuchi, Tokyo, Japan

[73] Assignee: NEC Corporation, Tokyo, Japan

[21] Appl. No.: 247,554

[22] Filed: May 23, 1994

[30] Foreign Application Priority Data

May 21, 1993 [JP] Japan ................................. 5-142866

[51] Int. Cl.⁶ ................................................. G11B 5/596
[52] U.S. Cl. .................................. 360/77.08; 360/78.04; 360/77.04; 360/77.02
[58] Field of Search ........................... 360/77.02, 77.04, 360/77.08, 75, 78.14, 77.07, 78.04

[56] References Cited

U.S. PATENT DOCUMENTS

| | | | |
|---|---|---|---|
| 4,896,228 | 1/1990 | Amakasu et al. | 360/77.04 |
| 5,053,897 | 10/1991 | Ikeshita | 360/77.04 |
| 5,109,502 | 4/1992 | Sasamoto et al. | 360/77.04 |
| 5,270,885 | 12/1993 | Satoh et al. | 360/77.04 |

*Primary Examiner*—Aristotelis Psitos
*Assistant Examiner*—Varsha A. Kapadia
*Attorney, Agent, or Firm*—Sughrue, Mion, Zinn, Macpeak & Seas

[57] ABSTRACT

A head positioning control device for a magnetic disk apparatus has a head selection circuit for selecting one of a plurality of magnetic heads based on an external head address, a servo control circuit for controlling a movement of a selected magnetic head to a prescribed position through a head positioning motor. A head positioning control unit sets prescribed control information in the servo control circuit based on an external instruction. A head address switching device is connected to the head selection circuit for receiving a head switching signal set by an external instruction, the head address and a burst-area information, and sending a prescribed head address to the head selection circuit. A sector pulse generator sends a sector pulse corresponding to a zone in which the magnetic head is positioned to the head address switching means. The head address switching means has a latch which, when a burst-area information is input, switches and outputs a head address input during an inputting of the burst-area information after the burst-area information becomes inactive. A first delay circuit outputs a signal flag indicating an existence of a head switching signal with the same timing as that of the head address output by the latch circuit. A second delay circuit outputs a signal flag indicating a completion of head address switching after a next burst-area information is read.

1 Claim, 7 Drawing Sheets

HEAD POSITIONING CONTROL DEVICE FOR A MAGNETIC DISK APPARATUS

BACKGROUND OF THE INVENTION

1. Field of the Invention

The present invention relates to a head positioning control device for a magnetic disk apparatus, and more particularly to a head positioning control device for a magnetic disk apparatus, capable of preventing the degradation of accuracy of magnetic head positioning in a device in which a servo area is included in a data recording area of a magnetic disk and a magnetic head is positioned on the basis of servo information read out from the servo area.

2. Description of the Related Art

In a conventional head positioning control device for a magnetic disk apparatus, a timing signal for switching a head address is supplied from a control device regardless of the position of a servo area which is written in a data recording area of a magnetic disk. Further, when a sector period is set correspondingly to a cylinder area, a microprocessor counts pulses generated every time the head passes through the cylinder and modifies the sector period, based on a cylinder address, for positioning the magnetic head. However, the above-described conventional head positioning control device has the following disadvantages.

First, when a head address is switched while the head is in a servo reference area (i.e., a burst-area) in a data recording area of a magnetic disk, it is not clear whether servo data latched in memory was read before or after the head address switching and thus servo information may become invalid and thus be cancelled. As a result of such cancellation of the incorrect servo information, the quantity of servo information necessary for accurate measurements of an amount of tracking error may not be read.

Second, since a microprocessor unit (MPU) is interposed between the magnetic head and the control device, when a sector period is changed in a cylinder area by referring to a cylinder address, a relatively long period of time is required for adjusting the sector period. Therefore, such a device may operate with a previous, and incorrect, sector period and burst-area information is attempted to be read out at a position of the disk which does not correspond to a burst-area, resulting in a degradation of the accuracy of tracking error measurement. For this reason, there is a degradation in head positioning control in conventional devices.

SUMMARY OF THE INVENTION

It is therefore an object of the present invention to eliminate the above-mentioned disadvantages and provide a head positioning control device for a magnetic disk apparatus capable of performing high precision servo control for each head address and avoiding the attempted reading of servo information from portions outside a burst-area of a data recording area of a magnetic disk.

According to the present invention, a head positioning control device for a magnetic disk apparatus has:

a head selection circuit for selecting one of a plurality of magnetic heads based on an externally set head address;

a servo control circuit for controlling movement of a selected magnetic head to a prescribed position through a head positioning motor;

a head positioning control unit for setting prescribed control information in the servo control circuit based on an external instruction;

a head address switching device provided in an input stage of the head selection circuit for receiving a head switching signal set by the external instruction, the head address and a burst-area signal, and sending a prescribed head address to the head selection circuit; and a sector pulse generator for sending a sector pulse corresponding to a zone in which the magnetic head is positioned to the head address switching means.

In a case where a head address HA is switched from "0" to "1" and a switching signal is received during a burst-area signal active state (i.e., when burst-area information is being read), the head address HA is latched at "0" since the burst-area information is being read and so the head is not switched during reading of burst-area information. After the active state of the burst-area signal BA is completed, the head address HA is switched to "1" and a signal flag FA, which is a switching signal, is output. Further, after reading a burst-area signal which is a first one after the head address HA is set to "1", a signal flag FB indicating that the burst-area signal has been read, is output. The head position control unit can thus clearly determine a current head address HA and a location from which the latched burst-area signal BA is originated by referring to the signal flags FA and FB.

BRIEF DESCRIPTION OF THE DRAWINGS

The above objects and features of this invention will become more apparent from the following detailed description when taken in conjunction with the attached drawings in which like reference numerals denote the same elements throughout.

DESCRIPTION OF THE PREFERRED EMBODIMENT

Before describing particulars of the preferred embodiment, a description of the various positioning information recorded on a disk is offered below. Specifically, there are three types of positioning information. Servo information is recorded in a servo area of a disk and includes common positioning information for a plurality of data heads with respect to corresponding disks. The servo information is read by a servo head. Off-track information is recorded in a burst-area which is a portion of the data recording surface, of the magnetic disks. Thus, the off-track information is read by a data reading head. Also, the off-track information indicates particular positioning information, for the individual data head by which it is read, which helps to position the head in the center of a data track. Finally, burst-area information is also recorded in the burst-area and indicates the actual recording width of the off-track information.

Figure 8:
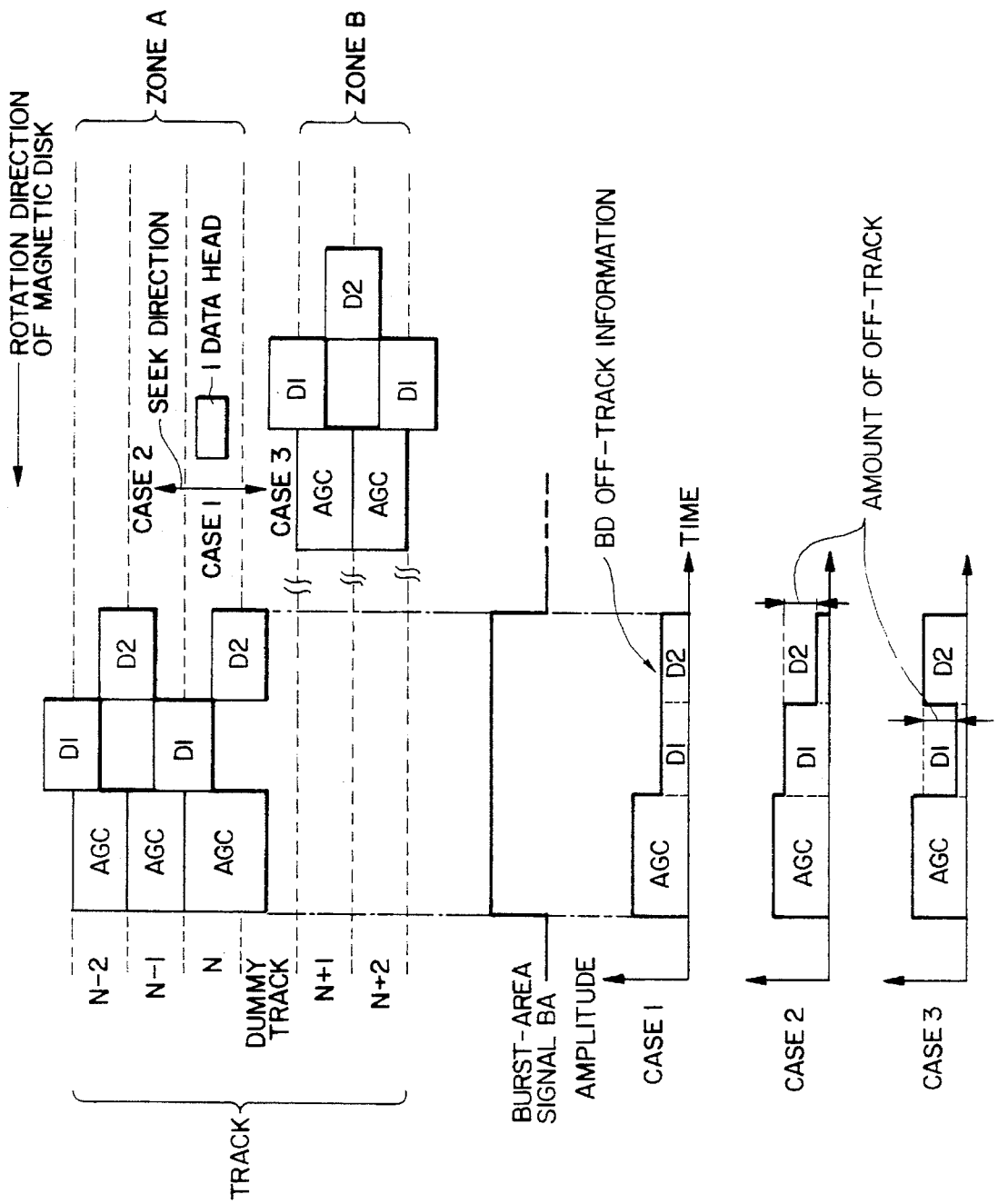
FIG. 8 illustrates the relationship between the burst-area signal and off-track information.

FIG. 8 illustrates an example of the relationship of a burst-area, burst-area information for generating a burst-area signal BA and off-track information BD. The head address HA indicates a selected data head. The off-track information BD is read from the burst-area in zone A by a data head while the burst-area signal is in an active state. Further, the off-track information includes two burst data values D1 and D2 for compensating for positional deviation of the data head from the center of track N (due to thermal expansion or other variables) and an AGC data value for indicating the amplitude of the burst-area data values D1 and D2. A head positioning controller performs estimation of the positional deviation of the data head based on the calculated difference in the amplitude of values D1 and D2, as read by the data head. A servo controller moves the data head in the radial direction of the magnetic disk to reduce the difference in these amplitudes to zero (thus indicating that the data head is at the center of the track).

Case 1 shows that the data head is accurately positioned at the center of the track N. Case 2 shows a data head which is deviated from the center of track N towards track N-1. Case 3 shows that the data head is deviated towards a dummy track. Of course, the position of the burst area, i.e. corresponding to an active state of a burst area signal changes based on a selected track (i.e. zone).

Figure 1:
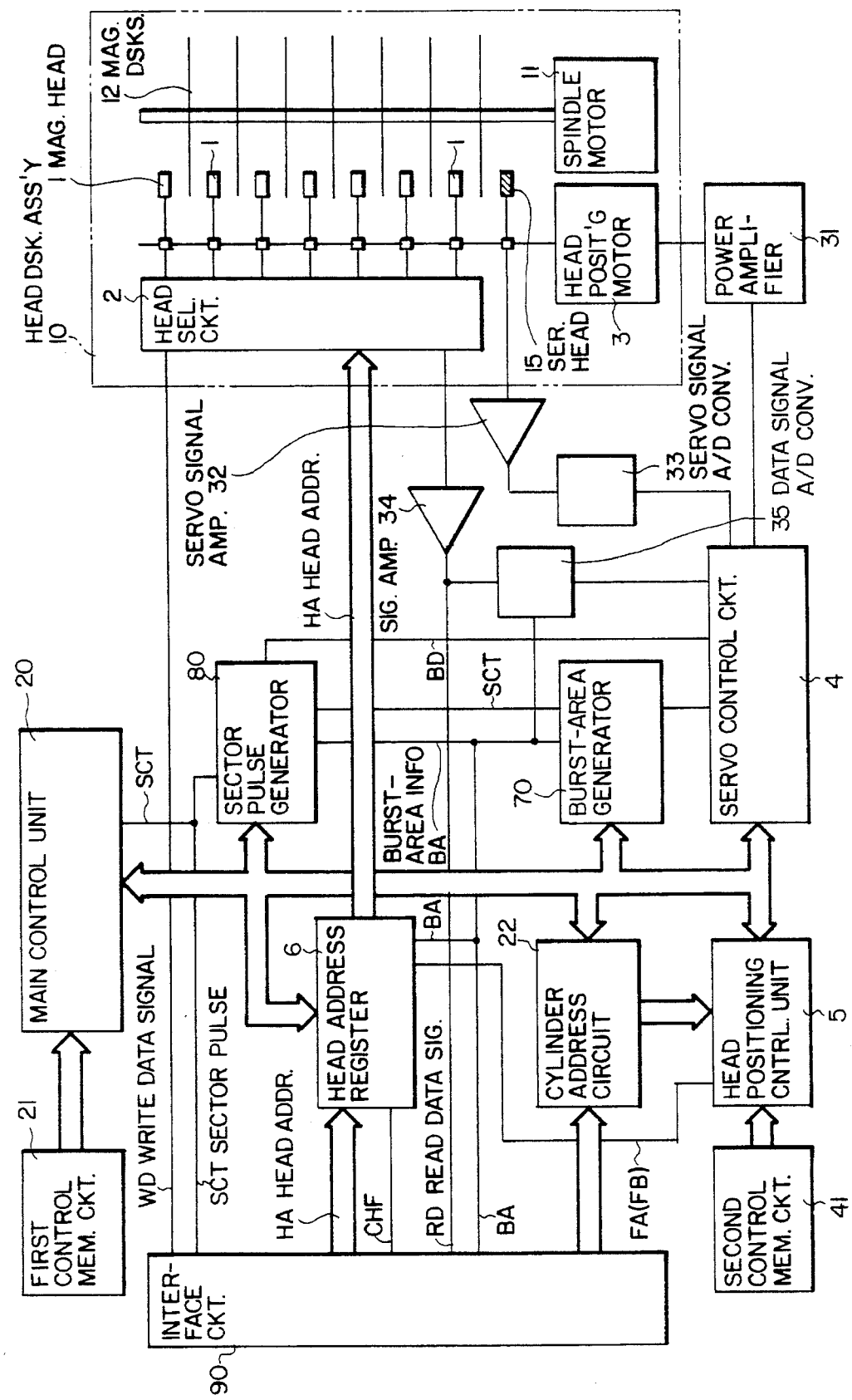
FIG. 1 is a block diagram of a preferred embodiment of a head positioning control device for a magnetic disk apparatus according to the present invention.

A preferred embodiment of the present invention is illustrated in FIGS. 1. A head positioning control device of a preferred embodiment of the present invention has a head selector circuit 2 for selecting one of a plurality of magnetic heads 1 according to an externally set head address HA, a servo control circuit 4 for controlling a movement of the selected magnetic head 1 to a prescribed position via a head positioning motor 3, and a head positioning control unit 5 for setting prescribed control information in the servo control circuit 4 according to an external instruction.

A head address register 6 is interposed between an interface circuit 90 and the head selector circuit 2, and is supplied with a head switching signal CHF which is generated in response to an external instruction, a head address HA for selecting a particular magnetic head 1, and a burst-area signal BA. In response to this information, the head address register outputs a prescribed head address HA. The head address register 6 also has a delayed address switching function for outputting the head address HA, when the head switching signal CHF (which is input during detection of burst-area information BA by the magnetic head 1 after the burst-area information BA) is detected. The timing of the head address input to head register 6 is used as an input timing of the head switching signal CHF and a next head switching signal CHF is generated after a first burst-area information BA, succeeding the output of the head address HA, is read out. This functionality is described in greater detail below.

A head disk assembly 10 includes the head selector circuit 2, a spindle motor 11 for rotating a plurality of magnetic disks 12, a head positioning motor 13 for moving the magnetic heads 1 and thus positioning them with respect to a corresponding disk 12, and a servo head 15 for reading servo information from the magnetic disks 1. The head selector circuit 2 also functions to select one of the plurality of magnetic heads 1, in response to a write data signal WD sent from the interface circuit 90, and outputs a read signal RD for the selected magnetic head 1 to the interface circuit 90 through an amplifier 34 when data is read out.

A main control unit 20 includes a microprocessor MPU which performs sequence control of the entire device by inputting data write, data read and seek commands to the head address register 6, a cylinder address circuit 22, the head positioning control unit 5, the servo control circuit 4, a burst-area generator 70 and the sector pulse generator 80, which are all connected through an MPU bus, according to a desired control program written in a first control memory circuit 21.

The servo control circuit 4 is supplied with positioning information read out from a servo area of the disks 12 by the servo head 15 through a servo signal amplifier 32 and a servo signal A/D converter 33. The servo control circuit also receives the off track compensation information read out from a burst-area of the data recording area by the magnetic head 1 through a signal amplifier 34 and a data-signal A/D converter 35. Further, the servo control circuit 4 also performs closed loop head positioning by outputting a positioning control signal to the head positioning motor 3 through a power amplifier 31 in a known manner. The head positioning control unit 5 includes a digital signal processor which performs head positioning control for the servo control circuit 4 in response to a prescribed instruction supplied externally from the interface circuit 90 through the cylinder address circuit 22 according to a control program written in a second control memory circuit 41.

Figure 2:
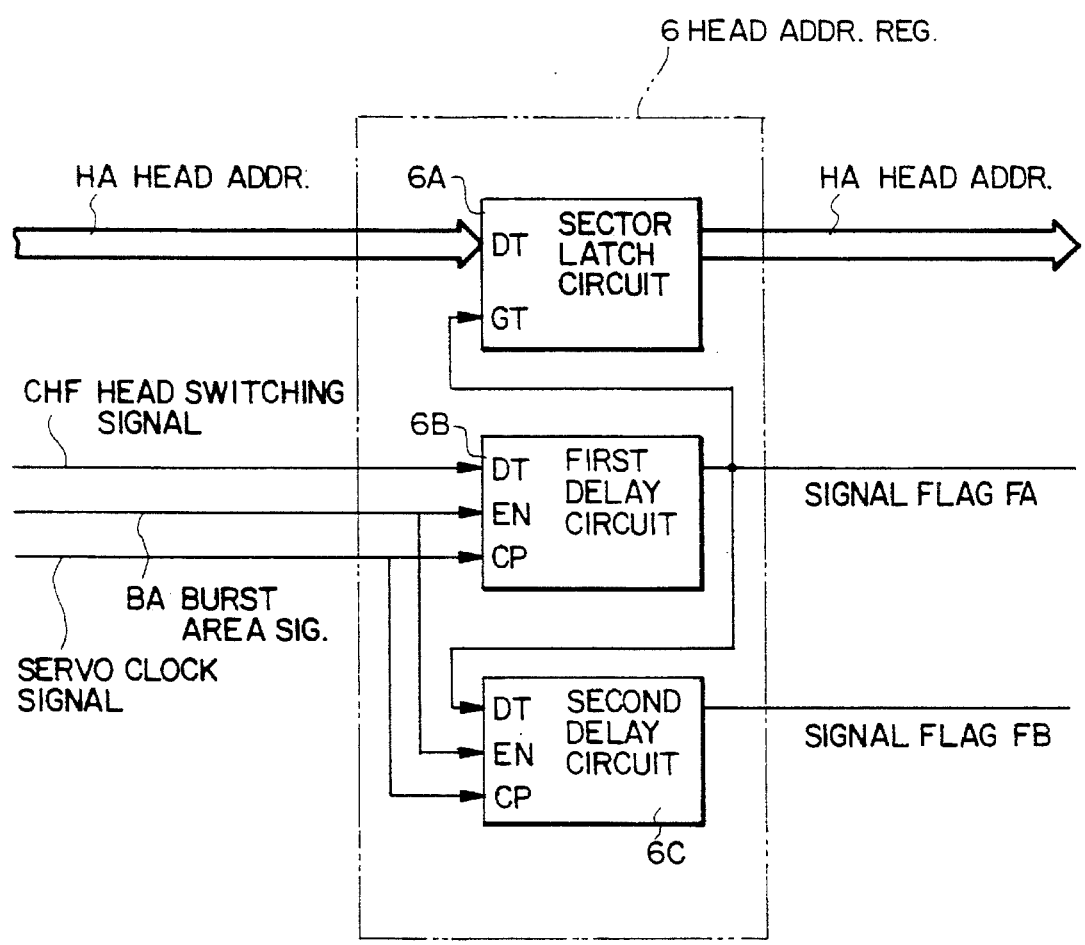
FIG. 2 is a block diagram of a head address register 6 of the embodiment of FIG. 1.

Referring to FIG. 2, the head address register 6 has a sector latch circuit 6A which, when burst-area information BA is being read, switches the head address to one inputted during the burst-area information BA which is input after the burst-area signal goes back to an inactive state, a first delay circuit 6B which outputs a signal flag FA indicating that there is a head switching signal CHF with the same timing as that of the head address HA, which is switched and outputted by the sector latch circuit 6A, and a second delay circuit 6C which outputs a signal flag FB as a next head switching signal after a burst-area signal BA (which occurred first after the address switching) is read. The sector latch circuit 6A directly outputs the input head address HA without change when there is no burst-area information BA being read and further has a function of outputting a head address HA which was previously stored in the latch circuit 6A when the burst-area signal BA is in an active state and outputting a currently input head address when the burst-area signal BA assumes an inactive state.

Figure 3:
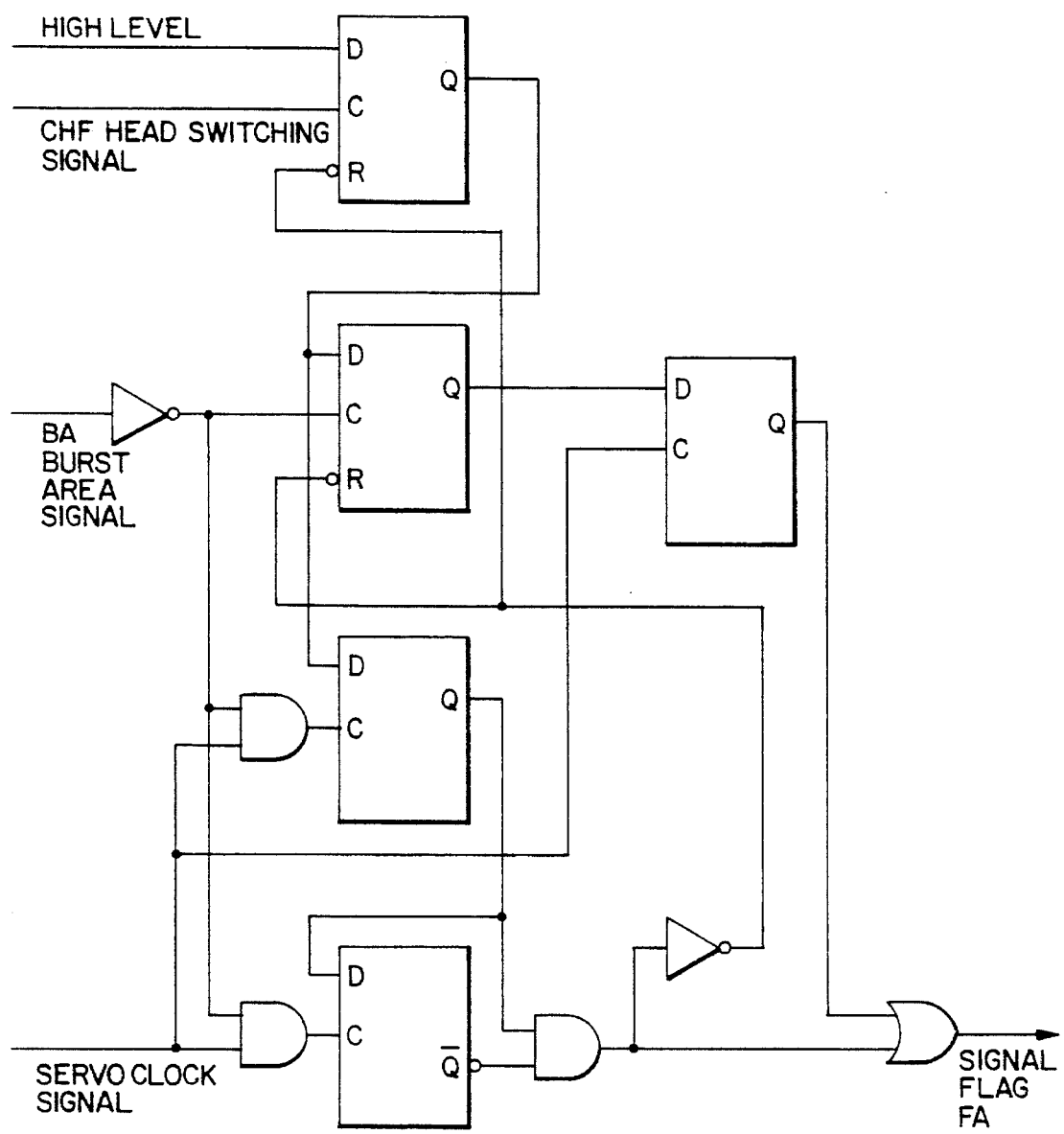
FIG. 3 is a block diagram of the first delay circuit of FIG. 2.
Figure 4:
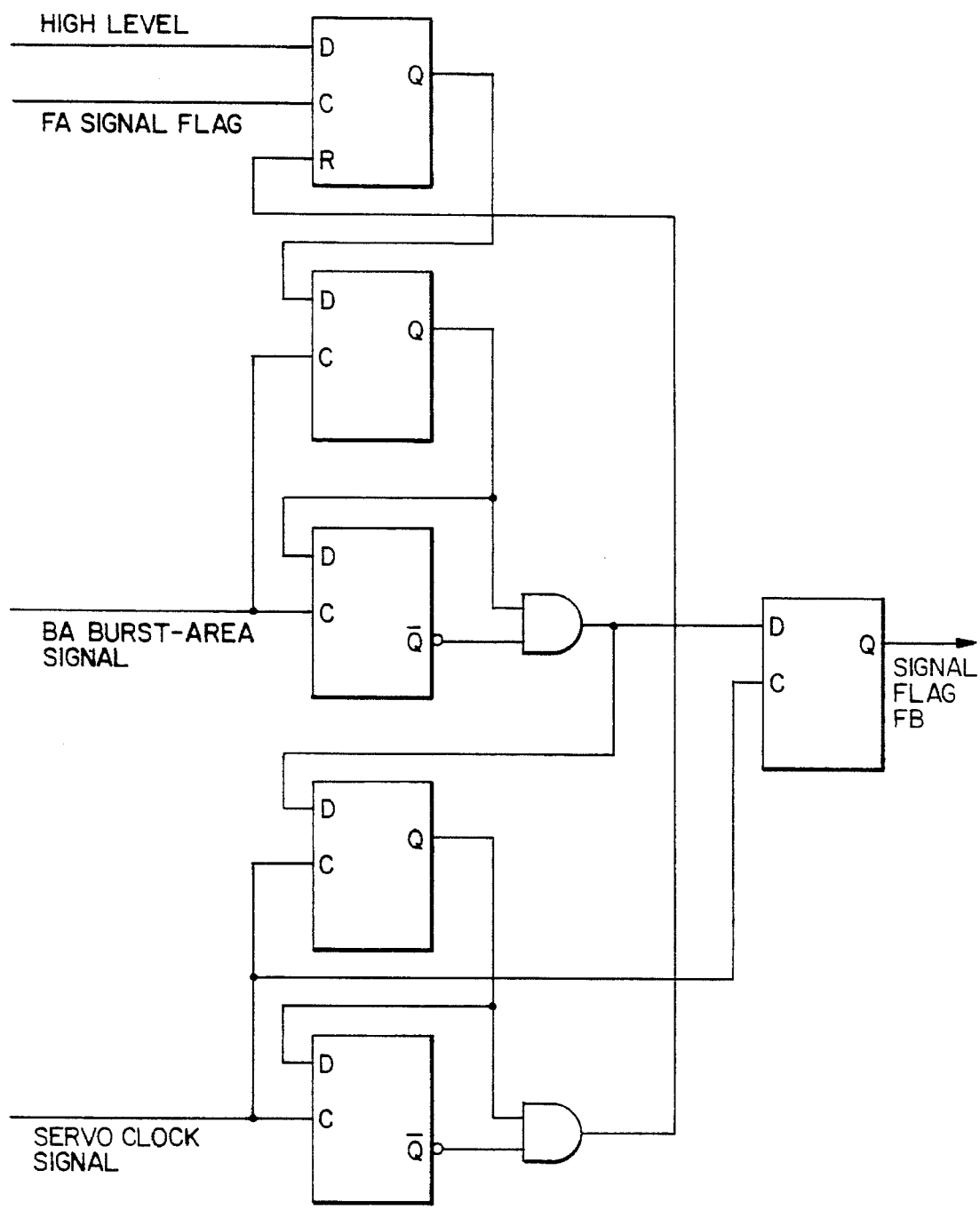
FIG. 4 is a block diagram of the second delay circuit of FIG. 2.

The first delay circuit 6B controls the head switching signal CHF sent together with the input head address HA with the same timing as the switching timing of the head address HA and, when the head switching signal is input while the burst-area signal BA is in an active state (i.e., burst-area information is being read), outputs the signal flag FA after the burst-area signal BA goes to an inactive state. Further, the second delay circuit 6C receives an output of the first delay circuit 6B and outputs the signal flag FB after the next burst-area signal BA is detected immediately after the head address is switched, namely, after a burst-area signal BA, which is a first one after the head address switching, is read out. The signal flag FA thus can be used to indicate to the head positioning control unit 5 that the data head 1 has actually moved from the previous track in which it was located at the time of the head positioning signal CHF. The signal flag FB is used to indicate that off-track information should be read from the burst-area of the new track to which the head 1 has been switched. FIG. 3 illustrates the logic of the first delay circuit 6B. FIG. 4 illustrates the logic of the second delay circuit 6C. Latch circuit 6A and delay circuits 6B and 6C can be constructed of known devices, such as preprogrammed microprocessor-based devices.

Figure 5:
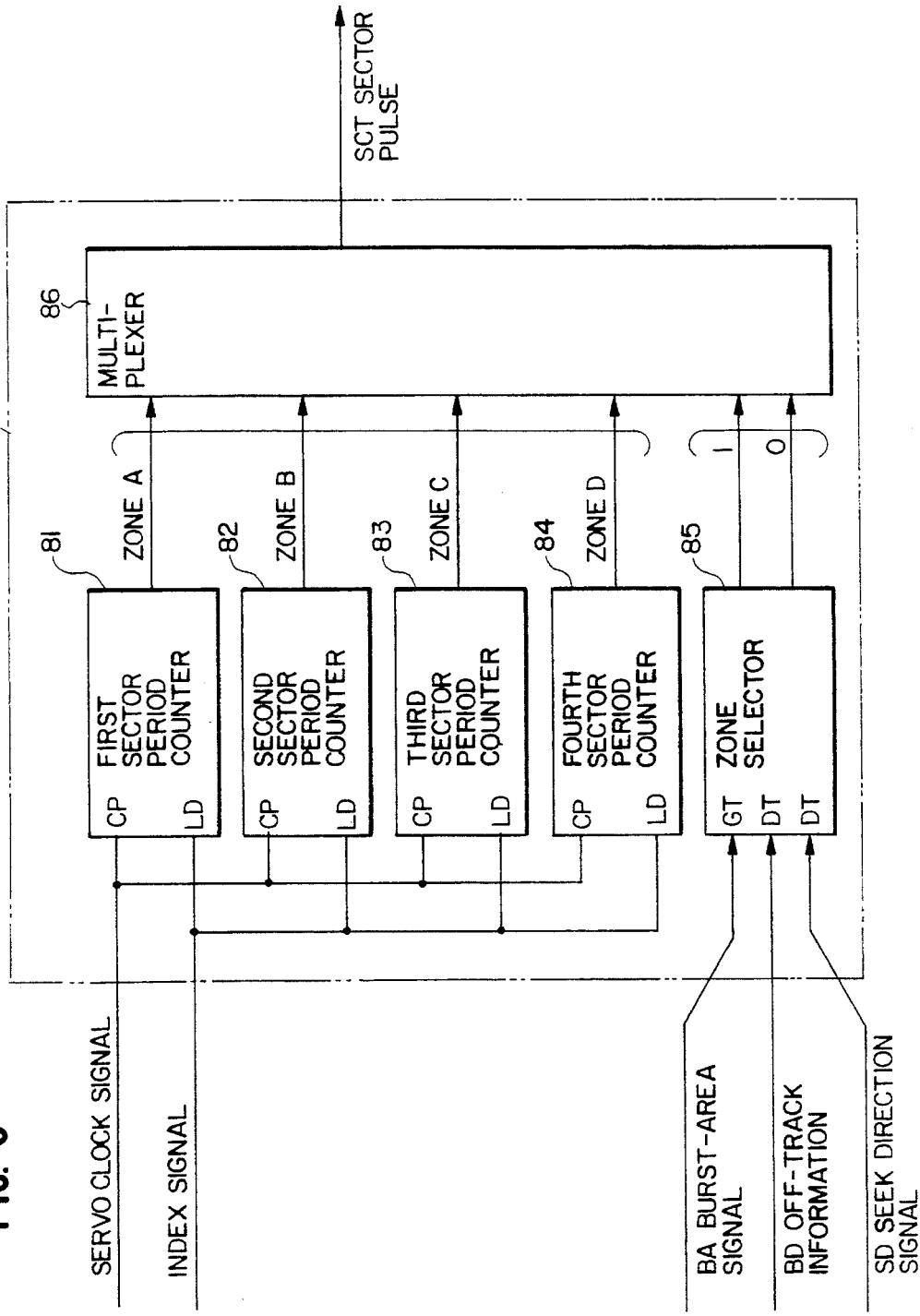
FIG. 5 is a block diagram of a sector pulse generator 80 of FIG. 1.

Referring to FIG. 5, the sector pulse generator 80 has first to fourth sector period counters 81 to 84 preset with four different time periods, respectively, a zone selector 85 responsive to a burst-area signal BA, off-track information BD recorded in the burst-area and an externally inputted seek direction signal SD for selecting a sector (i.e., zone) in a track in which the magnetic head 1 exists Also, a multiplexer 86 responsive to sector pulses from the respective sector period counters 81 to 84 and a zone select signal from the zone selector 85 to output a sector pulse set in a current zone. Specifically, the zone selector 85 determines whether or not the head 1 is positioned properly in a desired zone based on off-track information BD read from a burst-area of the desired zone. The amplitude of the AGC data read by head 1 is of a constant amplitude while the data head 1 is positioned in the same zone. However, when the data head 1 changes zones, the amplitude of the AGC data becomes unstable because the burst-area signal active state does not correspond to the position where the off-track information is actually recorded. The zone selector 85 outputs a zone selection signal for moving the data head 1 from the current zone to a zone specified by a seek direction signal SD. An appropriate one of counters 81–84 is selected based on the zone selection signal. Each of counters 81–84 is set with an appropriate sector period by a servo clock signal and an index signal.

Figure 6:
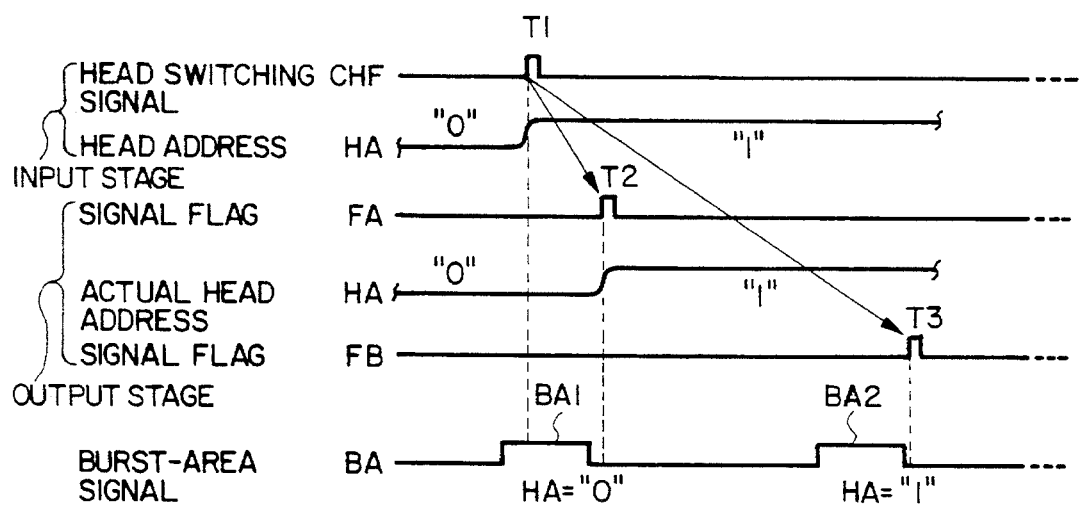
FIG. 6 is an illustration showing an example of a switching timing of the head address register 6 of FIG. 1.

FIG. 6 shows a timing of the respective output signals when the head address HA and the head switching signal CHF are inputted during generation of the burst-area signal BA. Referring to FIG. 4, the head address HA is switched from "0" to "1" at time T1 and the switching signal is received during period BA1 of the burst-area signal BA which indicates an active state of reading a burst-area signal. In this case, the switching of the magnetic head 1 is not performed as yet since the burst-area signal BA is being read and the actual head address HA is therefore held at "0". Next, after the burst-area signal BA assumes an inactive state at time T2, that is, after period BA1 of the burst-area signal BA has elapsed, the actual head address HA is switched to "1" in response to the signal flag FA which is output as a switching signal. Further, after period BA2 of the burst-area signal BA (which is a first burst-area signal after the head address HA becomes "1") is read out, the signal flag FB indicting that the burst-area signal BA head become "1" is output at time T3. As a result, the head positioning control unit 5 can clearly know, due to the state of the signal flags FA and FB, a current head address HA and a source location from which the burst-area signal BA is originated.

Figure 7:
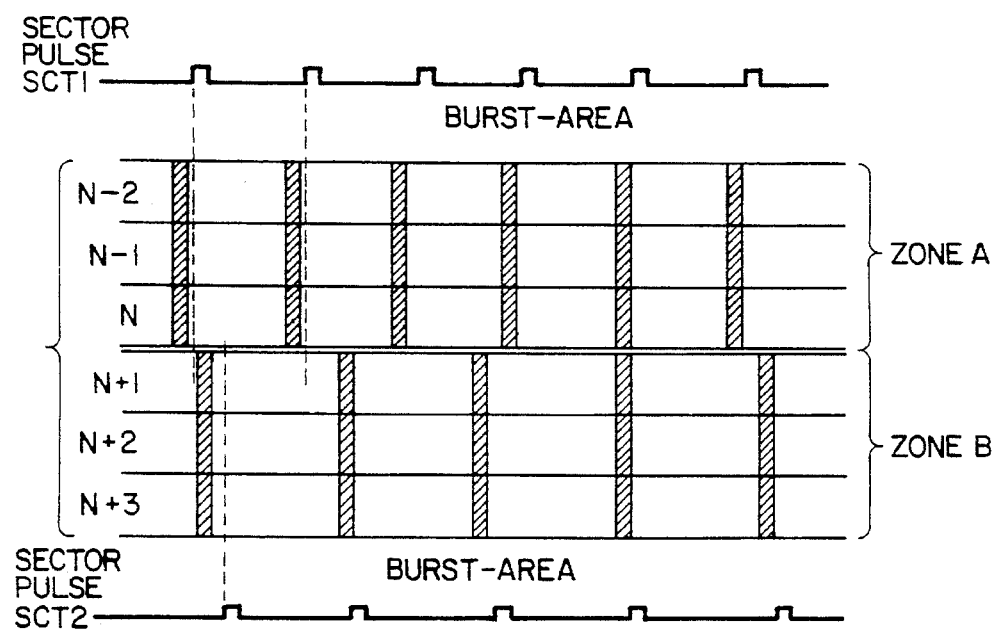
FIG. 7 illustrates an example of a positional relationship between the sector pulse SCT and the burst-area information BA when there are a plurality of sector periods.

FIG. 7 shows the positional relationship between the sector pulse SCT and the burst-area information BA when there are a plurality of sector periods. The burst-area information BA depends upon the sector period. Therefore, when a seek operation from track "N–2" to "N+3", for example, is performed, a position of the burst-area signal BA and a servo data read out are checked for the period of a zone A and, when abnormal data is detected in the track "N+1", that is, a burst-area signal BA is read out in a location outside the burst-area, it is judged as being shifted to an adjacent zone and the sector period is switched to the zone B. By selecting a correct zone before positioning the head to the track "N+3" in this manner, a degradation of the accuracy of head positioning control can be prevented.

According to the present invention in which the signal flag is output after a first burst-area signal from the head address switching is read out, it is possible to clearly distinguish the burst-area signal for every head address and, therefore it becomes possible to effectively prevent the head positioning accuracy from being degraded. Further, since the burst-area signal having different positions on tracks are read out with the switching timing of the particular sector period, it is possible to perform the switching of the sector period on a track which is a boundary thereof. Therefore, the possibility of a read out outside of the burst-area due to delay of switching is reduced when compared with conventional devices in which the microprocessor, which is the main control unit, is used and thus degradation of accuracy of measurement of an amount of off-track can be effectively reduced.

Although the present invention has been fully described by way of a preferred embodiment thereof with reference to the accompanying drawings, various changes and modifications will be apparent to those having skill in this field without departing from the scope of the present invention, as defined by the appended claims.

What is claimed is:

1. A head positioning control device for a magnetic disk apparatus, comprising:

a head selection circuit for selecting one of a plurality of magnetic heads based on an externally set head address;

a servo control circuit for controlling a movement of a selected magnetic head to a prescribed position through a head positioning motor;

a head positioning control unit for setting prescribed control information in said servo control circuit based on an external instruction;

head address switching means provided in an input stage of said head selection circuit for receiving a head switching signal set by said external instruction, said head address and a burst-area signal, and sending said head address to said head selection circuit at a prescribed time based on a status of the burst-area signal; and sector pulse generating means for sending a sector pulse, which corresponds to a zone in which said magnetic head is positioned, to said head address switching means;

wherein said sector pulse generating means comprises a plurality of counters having respective different pre-set sector periods, a zone selector responsive to a burst-area signal, off-track information recorded in a burst-area and an externally input seek direction signal for selecting a sector period in a track in which said magnetic head is positioned, and a multiplexer responsive to sector pulses output from said plurality of counters and a zone selection signal output from said zone selector for outputting a sector pulse in said zone in which said magnetic head is positioned.

* * * * *